United States Patent
Ho et al.

(10) Patent No.: US 7,512,060 B1
(45) Date of Patent: Mar. 31, 2009

(54) METHOD AND APPARATUS FOR PROVIDING A CONNECTION MATRIX

(76) Inventors: Michael Ho, 4318 Union Street, Burnaby, BC (CA) V5C 2X6; Chris Falkingham, 307-3300 Oak Street, Vancouver (CA) V6H 2L6; Michael Kauschke, Am Melerhof 19, 38122 Braunschweig (DE); Miriam Qunell, 1077 Collingwood, Naperville, IL (US) 60540; Jean-Michel Cala, 630 Athens St., San Francisco, CA (US) 94112

( * ) Notice: Subject to any disclaimer, the term of this patent is extended or adjusted under 35 U.S.C. 154(b) by 831 days.

(21) Appl. No.: 11/015,967

(22) Filed: Dec. 17, 2004

(51) Int. Cl.
*H04J 1/16* (2006.01)
*H04J 3/14* (2006.01)

(52) U.S. Cl. .................................................. 370/216

(58) Field of Classification Search ................ 370/216, 370/217–228, 241, 242, 244, 248, 250; 714/100, 714/1, 2; 709/238, 239
See application file for complete search history.

(56) References Cited

U.S. PATENT DOCUMENTS

| | | | |
|---|---|---|---|
| 6,081,503 A * | 6/2000 | Bordogna et al. | 370/222 |
| 6,560,202 B1 | 5/2003 | Bordogna et al. | |
| 2005/0169167 A1* | 8/2005 | Tazawa | 370/216 |
| 2006/0056843 A1* | 3/2006 | Fee et al. | 398/19 |

* cited by examiner

*Primary Examiner*—Ajit Patel
(74) *Attorney, Agent, or Firm*—Blakely, Sokoloff, Taylor & Zafman LLP

(57) ABSTRACT

A method and apparatus for enabling restoration of connections upon failure within a high-speed data transfer architecture, such as SONET/SDH channel, is provided. The design detects health codes generated by detecting elements, the health codes representing the health of each channel. The design processes these health codes to determine re-provisioning of the failing connection where appropriate. This restoration decision-making apparatus communicates the resultant re-provisioning scheme to repairing elements. The design may detect and communicate health codes relating the health of each channel to determine which code reports a healthier channel among a plurality of transport channels available for carrying re-provisioned traffic due to a failed connection.

27 Claims, 4 Drawing Sheets

METHOD AND APPARATUS FOR PROVIDING A CONNECTION MATRIX

BACKGROUND OF THE INVENTION

1. Field of the Invention

The present invention relates generally to the field of high-speed data transfer, and more specifically to enabling fast restoration of failed connections and flexible control over the restoration process in a data transfer architecture.

2. Description of the Related Art

High-speed high bandwidth data communication systems employ a variety of components to facilitate the receipt and transmission of data packets. Components include network nodes, which may be comprised of functional components such as framers and cross- The cross connect allows portions of a digital bit stream to be rerouted or connected to different bit streams. Cross connects enable data traffic to be moved from one ring to the next ring in a path and ultimately to the destination node.

Typically, these high-speed high bandwidth data communication systems are realized by interconnecting a large number of network nodes to receive and transmit ever-increasing amounts of data. A network node within these systems may be comprised of a variety of functional components, and in certain circumstances may encounter "connection faults," or faults in establishing connections between network nodes. A network node that remedies connection faults by switching to redundant connections may have health detection functionality and restoration functionality executing in separate network elements, or in other words, one component may assess health while another component may address health. Each network element is responsible for measuring and monitoring the health or quality of all available transport channels, whether carrying traffic or in standby available for provisioning.

To monitor transport channel health and address failures, components maintain or exhibit certain parameters called "health codes." These elements may include a health detecting function that can generate a suite of health codes in the form of statuses, alarms and defects related to the quality of each channel. Certain elements may communicate their health codes to other downstream elements in the system.

Transport networks can rapidly restore connections upon failures. For example, SONET/SDH employs various restoration schemes, including but not limited to Bi-directional Line Switched Ring (BLSR)/Multiplex Section Shared Protection Ring (MSSPring), Unidirectional Path Switched Rings (UPSR)/Subnetwork Connection Protection Rings (SNCP), Line protection Automatic Protection Switching Linear 1+1 (APS 1+1), Mesh protection, and Complex mesh schemes (e.g. Meta-Mesh (M-M), Shared Backup Path Protection (SBPP), and True Path Restoration).

These various restoration schemes may involve activities at the framer device, any cross-connection matrices connected to them, and a controller to re-provision the matrices for the new connections, where cross connect matrices are provided for traffic routing and map inputs to outputs for the cross connections.

Today's high speed communication systems, such as those conforming to SONET/SDH, generally support standard techniques to detect and filter defects and alarms and communicate the detected status to a repairing element, typically a cross connect. The inherent difficulty with these deployed SONET/SDH systems is that they typically employ fixed and generally inflexible hardware circuits to determine the repair needed and effectuate the repair at the cross connect. Current hardware solutions can frequently restore the failed connection, but these hardware solutions may not provide scheduling and health analysis functions, and frequently are not able to modify stored connection maps, where connection maps provide a listing of current connections for the component. Due to these limitations, hardware solutions require storage of multiple pre-provisioned connection maps, and storage requirements can limit the number of restoration schemes and connection maps available. Also, stored fixed restoration schemes employing pre-provisioned connection maps to implement repairs are not well suited to effectively restore multiple simultaneous channel failures. Operator commands, time of day, or certain node and network conditions can trigger traffic rerouting and require replacing the current primary map with one of the alternate maps.

Health codes may be exported to an external Network Management System/Element Management System (NMS/EMS) that executes system software to determine the appropriate repair. Once an element or node makes a decision to restore/repair, the NMS/EMS communicates commands to the repairing element to implement the repair. NMS/EMS based solutions are unable to restore failed connections in a relatively rapid manner, partially due to communications and processing overhead supporting alarms and defects from the detecting element. SONET/SDH standards define relatively fast switching times objectives (e.g. less than 50-millisecond protection switching) for various automated protection schemes (e.g. 1+1 and 1:N line protection) to rapidly restore connections after failure.

Thus, the common challenge faced in today's network architectures occurs when the network element responsible for repairing the a failure within a transport channel must rapidly and accurately interpret the transport channel health and initiate appropriate corrective restoration scheme to restore one or more simultaneous failing connections.

A design that enables efficient analysis of transport channel health and incorporates flexible user control to reconfigure the behavior of the decision making process at the cross-connect matrix in response to detected failures, and provides rapid restoration of failed connections may provide increased throughput and other advantageous qualities over previously known designs, including designs employing the SONET/SDH architecture.

DESCRIPTION OF THE DRAWINGS

The present invention is illustrated by way of example, and not by way of limitation, in the figures of the accompanying drawing in which.

DETAILED DESCRIPTION OF THE INVENTION

Reference will now be made in detail to the preferred embodiments of the design, examples of which are illustrated in the accompanying drawings and tables. While the design will be described in conjunction with the preferred embodiments, it will be understood that they are not intended to limit the design to those embodiments. On the contrary, the design is intended to cover alternatives, modifications, and equivalents, which may be included within the spirit and scope of the design as defined by the appended claims.

The present design provides a mechanism for detecting a plurality of health codes, relating the health of each transport channel, originating from detecting SONET/SDH elements and communicating the detected status relating one or more conditions and associated priorities to other network elements responsible for repairing the connection within a system implementing a network node. One embodiment of the present design is a network architecture that restores a network node connection fault by switching to a redundant connection (e.g. protection switching) where the restoration decision making process is based on the transport channel health, wherein the health detection function and the function of restoring the connection reside in separate network elements.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of "health", Bellcore GR-253, ANSI T1.105, ITU G.707, G.751, G.783, and G.804.

System Design

Figure 1A:
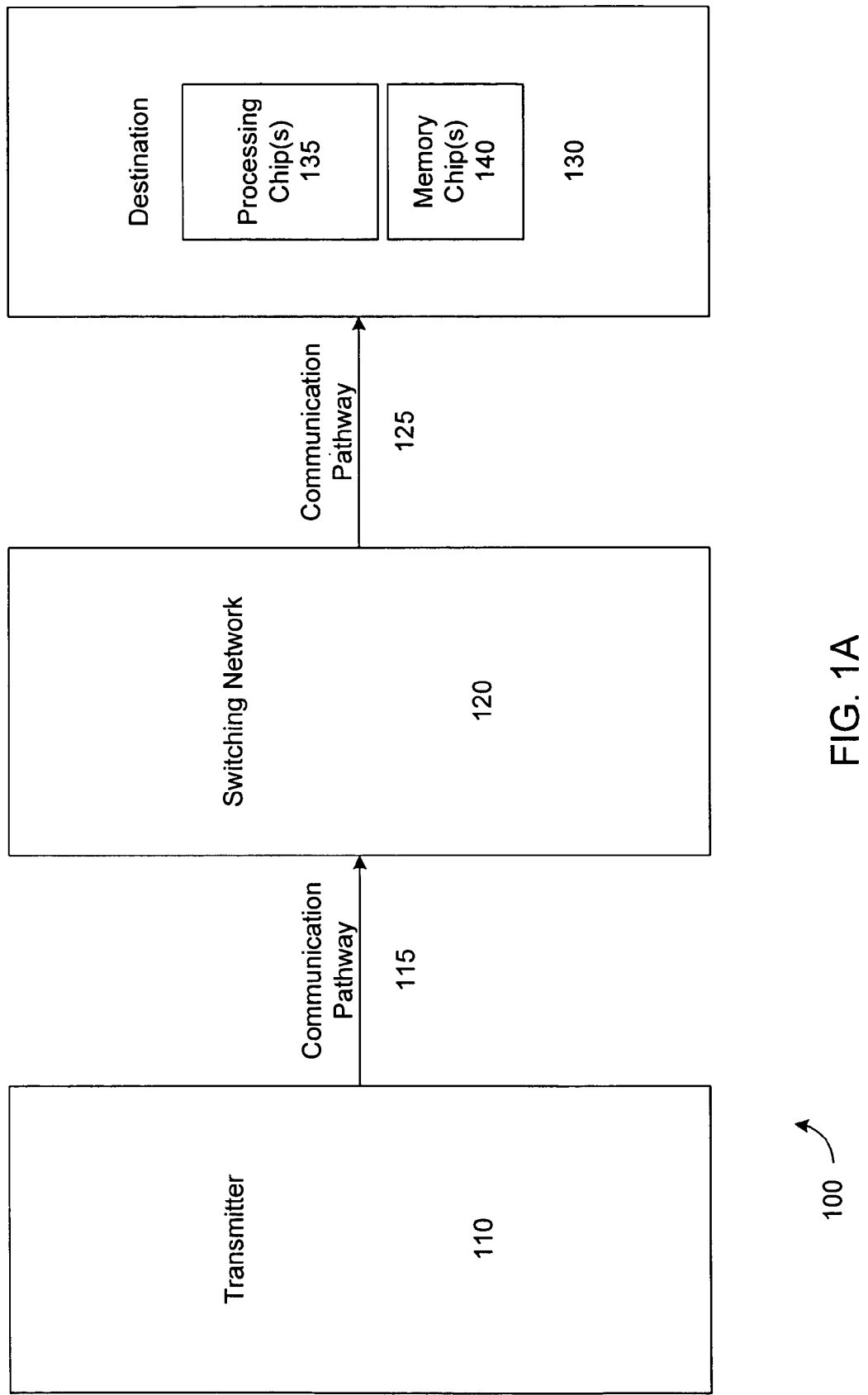
FIG. 1A is a conceptual illustration of a SONET/SDH communications switching system employing the design provided herein.

A typical SONET/SDH switching system 100 is shown in FIG. 1A. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 1B:
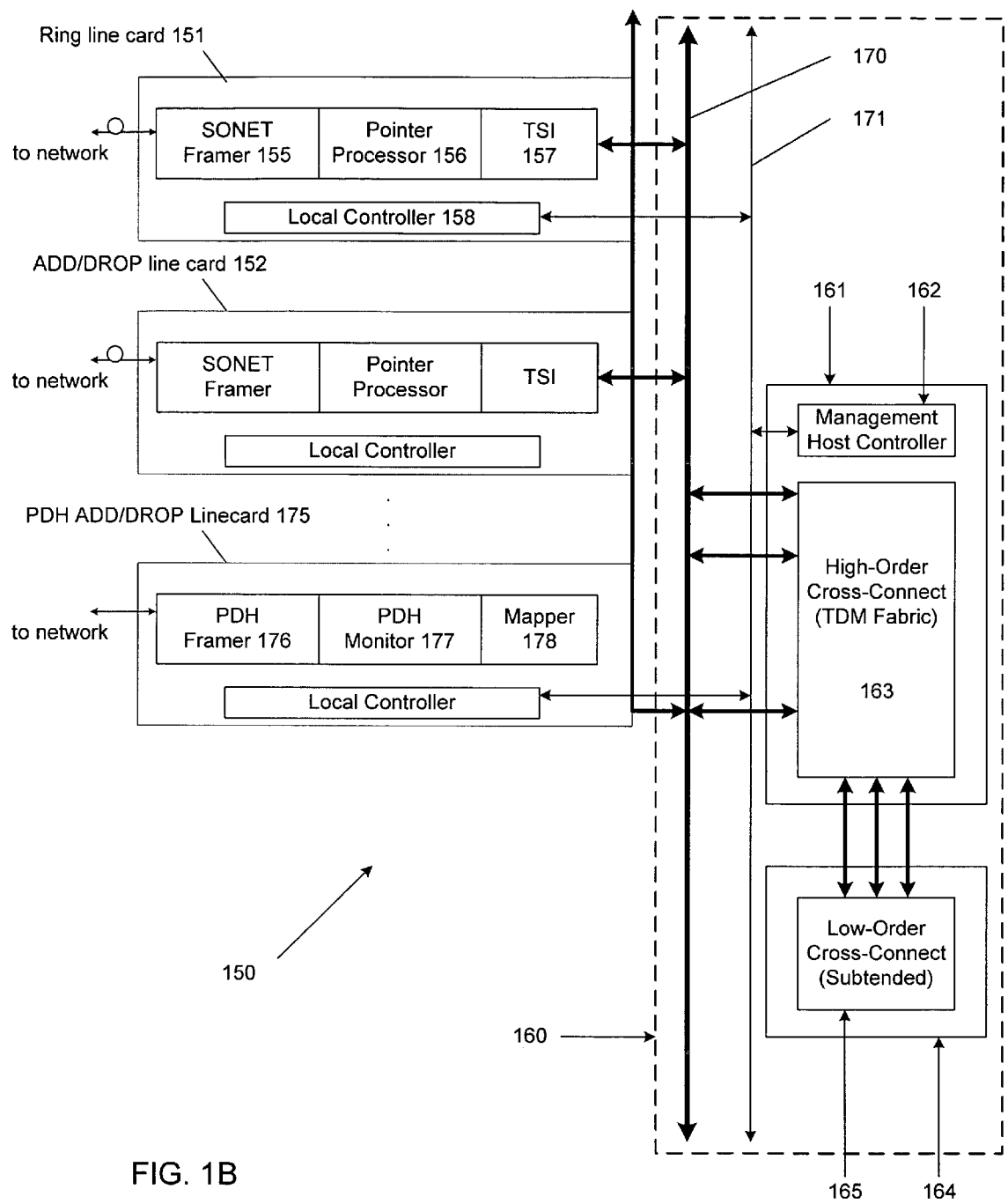
FIG. 1B shows a suitable system embodiment in accordance with an embodiment of the present invention.

FIG. 1B is a drawing of a typical SONET/SDH Add-Drop Multiplex (ADM) 150. The ADM 150 manages SONET/SDH network topologies, the most typical topology being a ring. In a ring topology, the ADM 150 connects to the ring using two linecards: a first (ring) linecard 151 connected to the West Interface and a second (ADD/DROP) linecard 152 connected to the East Interface. Other linecards can be used as traffic sources and sinks (not shown), where a source may be involved in an ADD operation, and a sink may be involved in a DROP operation. An ADD operation inserts traffic from the source onto the ring, and a DROP operation removes traffic off the ring to the sink.

Each ring linecard, such as first linecard 151, may include a framer 155, pointer processor 156, and a timeslot interchange (TSI) 157. The framer 155 can be used to locate the beginning of a SONET/SDH frame. The pointer processor 156 may locate the payload and align the payload for the TSI and fabric 160. The TSI 157 may move or groom timeslots within an SONET/SDH frame to provide orderly traffic to the fabric card 161.

Different types of ADD/DROP linecards exist. Some ADD/DROP linecards may handle Ethernet packets, Plesiosynchronous digital hierarchy (PDH) traffic (T1, T3, E1, E3, etc), and/or transit traffic from other SONET/SDH rings. Other types of ADD/DROP linecards may include transit ADD/DROP linecards, similar to the RING linecards. A PDH linecard may contain a T1/E1 framer that searches for the beginning of T1/E1 frame, a performance monitoring function for tracking the status of the incoming frame, and a mapper to insert the PDH traffic into a SONET/SDH frame, thus making the PDH traffic understandable to the fabric 160. PDH ADD/DROP linecard 175 includes PDH framer 176, PDH Monitor 177, and mapper 178.

Fabric management card 161 contains management host controller 162 and high order cross connect or TDM fabric 163, and may interface with subtended fabric 164 containing low-order cross-connect 165. The subtended fabric 164 may fit in one or more line card slots. Fabric backplane 171 may be TFI-5 or proprietary, for example. Control plane 172 may be PCI compatible or a simple microcontroller interface depending on the application. Other configurations may be employed for the backplane and control plane elements.

The transmission path of the ADM 150 comprises a time division multiplexing (TDM) fabric or cross-connect 160 that moves traffic among all the linecards attached to the fabric 160. A high-order cross-connect or fabric moves high-order SONET/SDH containers between linecards and amongst time-slots within a SONET/SDH framer. A full function ADM 150 can manipulate low-order as well as high-order SONET/SDH containers. The low-order manipulation can be performed in a subtended low-order cross-connect. Use of multiple fabrics may create issues that could be resolved by providing a single, unified fabric as is done in the current design.

Reconfigurable Connection Matrix

Network elements in a high speed communication environment, such as SONET/SDH, generate and report a plurality of health codes including but not limited to statuses, alarms, and defects. Each health code may be assigned a severity level by the reporting network element.

The repairing element may filter these detected health codes and associated severity assignments to prevent erroneous health codes from causing undesired protection switches. In such a situation, reporting an unfiltered health code may result in the network element considering a network element defective when it is not, and activating a protection switch to address the perceived defect issue.

Health codes enable repairing network elements to identify a healthiest channel by comparing health code values received for all channels within the fabric. The term "fabric" refers to a type of switch having the capacity to attach and direct data traffic. Switching fabric is a combination of hardware and software that moves data coming in to a network node out by the correct port to the next node in the network. Switching fabric includes the switching units in a node, the integrated circuits these switching units contain, and the programming that allows control of switching paths.

The challenge faced occurs when the network element responsible for repairing a failure within a transport channel must rapidly and accurately interpret the transport channel health and initiate appropriate corrective action to restore a failing connection. Inflexible hardware circuits are unable to compute implementation independent connection graphs using state and history information.

Connection graphs provide graphical representations of connections within the network, and may employ state information and/or history information to represent the network graphically. For example, if a switch state is closed because an associated component is unavailable, this state may be represented in the graph. History information may include data that has been known or a history of information about the network and may be used to graphically represent the connections.

These designs do not afford a flexible protocol analysis and decision making process that can provide a limited number of restoration schemes. The systems based on external system software to make the repair decision and communicate the appropriate commands back to the repairing element, require a large number of pre-provisioned maps, representing thousands of scenarios, all stored at the cross connect.

The present design is a technique whereby the health of a connection channel generated and reported by a network element is detected and optionally filtered, communicated to the repairing element, a restoration determined based on the connection channel health values, and repair is realized by re-provisioning the cross connect. This design may provide for detecting transport channel health codes (e.g. statuses, alarms and defects) and filtering these codes to extract one or more of the highest severity health status originating from detecting network elements representing a connection fault, communicating the detected status to a network element responsible for repairing the connection, applying a filter, such as a persistent filter, at the repairing network element to prevent erroneous health codes from causing undesired protection switches to occur, employing a processing device such as a micro engine inside a repairing element, to determine how best to repair the failed connection within the available network fabric, and re-provisioning the cross connect to affect a relatively rapid repair for the failed connection.

The present design will be illustrated below in an exemplary SONET/SDH transport data flow system utilizing separate elements for detection functions and restore functions. The present design is applicable to any network architecture where the detecting functions are located in a separate device from the function employed to restore connections.

Figure 2:
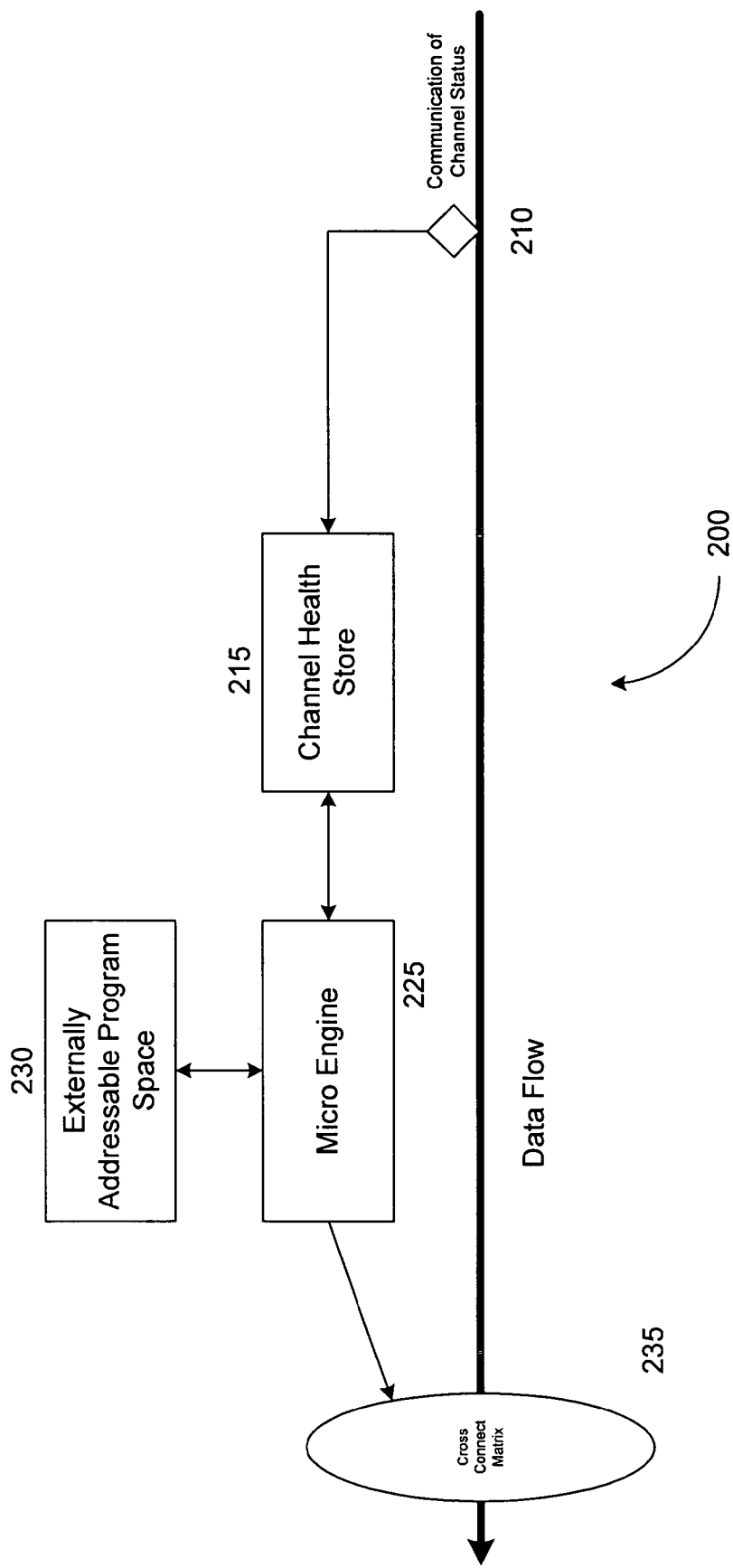
FIG. 2 is a conceptual illustration of a generically reconfigurable restoration connection matrix.

A generically re-configurable restoration connection matrix for a transport system 200 is shown in FIG. 2 in accordance with an illustrative embodiment of the design.

The transport system 200 may conform to SONET/SDH standards. FIG. 2 illustrates an example of SONET/SDH implementation where health codes originating from detecting network elements (not shown) and other system statuses, including but not limited to pointer and overhead processors, are communicated in-band using available transport overhead bytes to convey network health to a down stream repairing element. Pointer processing accommodates possible movement of the non-synchronous payloads within SONET/SDH containers. Path overhead processing entails processing all defined transport overhead and path overhead bytes, including framing, scrambling and de-scrambling, alarm signal insertion and detection, and remote failure insertion and detection. In-band signaling entails making three bytes available in the section layer to form a 192 kbs message channel, providing a message-based channel for transmission of alarms, maintenance, control, and administration between section-terminating network equipment.

The repairing element receives the health codes and processes the health codes using a user programmable processor or micro engine. The processing determines the healthiest channel from among the available transport channels by directly comparing the health code values received for multiple transport channels. The repairing element then determines how to repair the failed connection depending on the failure encountered and may re-provision the connection using a separate network element within the system.

Repair may require, among other options, removing a transport channel from consideration in a worst case, or possibly alerting a physical repair person or entity, or requesting application of power to a powered down component. Repair options depend on circumstance and available repair means, and are broadly known within the art. For example, if a component is not transmitting data and it is simply turned off, repair may comprise either sending an alert to an appropriate entity requesting powering up the component, or providing a signal to a control component to provide power to the component, or simply bypassing the component or channel altogether. In the present discussion, repair will be generally referenced, but such repair is to be understood to be circumstance, available repair means, and architect dependent as known to those skilled in the art.

In the generically reconfigurable restoration connection matrix for a transport system 200, one or more detecting network elements, one or more high order data path processors, and one or more low order data path processors may generate and send encodings of detected statuses, alarms, and defects. These encodings represent the quality of each observed transport channel and communicate the quality via interoperable health codes, in one embodiment using in-band signaling techniques, at 210. The present design is not limited to using an in-band signaling communication technique for conveying network health, but instead may encompass any type of signaling.

Health codes are received and stored by a channel health storage unit 215, located adjacent to the cross connect in FIG. 2, and made available to the network element for analysis. Each health code may be received at point 210 as a formatted three bit priority code, wherein the highest encoded priority may represent the worst defects or alarms, and the lowest priority may be for no defects or alarms. In this arrangement, the lowest priority health code represents the healthiest transport channel.

The processor or micro engine 225 may analyze the health of each incoming channel. The micro engine 225 may control mapping of the fabric, detect defects at the pointer processors, and switch at the cross connects. Switching entails applying a switch and changing a state for purposes of repair. Micro engine 225 may analyze a protocol carried in any of the transport overhead bytes, and such functionality may in one embodiment be provided by an operator or user. The micro engine restoration decision-making process may be provided via externally addressable program space 130 to implement any standard or proprietary transport restoration scheme. In other words, the design is fashioned to receive a health code in a prearranged format and assess health based on the data received in the prearranged format.

The micro engine 225 may extract the encoded control messages from the channel health store 215 at the cross connect matrix. The micro engine 225 may further extract resident state memory and timer information. The micro engine 225 may apply a persistent filtering scheme to prevent erroneous health codes from causing undesired protection switches to occur. One such filter may count the number of consecutive frames having the same health code. This count of the number of consecutive frames can vary depending on desired performance. Once this count of consecutive frames having the same health code is reached, the micro engine 225 may accept the health code for processing. At this point, the micro engine 225 may forward the filtered health code to a lookup table. Health codes are stored and may subsequently be accessed by the micro engine 225.

The micro engine 225 may compare extracted health codes, make protection switch decisions, and provide relatively fast matrix reconfiguration capabilities. The micro engine 225 can then select appropriate protection maps at the cross connect. The micro engine 225 may employ two types of connection maps, namely a working map and a protection map. An output connection map can be a table of coordinates used to identify those inputs connected to specific available outputs. A working map typically contains connection coordinates for the working connections for each connectable container, such as a SONET/SDH container. Protection maps are typically employed in the presence of protection switching, where protection switching allows data on a failed component to be moved to an alternate component. Several protection maps may be used to derive connection coordinates for the protection connections. These coordinates uniquely identify each Tributary Unit (TU) or Administrative Unit (AU) within a protection switching scheme. Coordinates can be high order or low order, where high order coordinates identify to the AU level and low order to the TU level. Maps may be provisioned via the micro engine interface (not shown).

A working map is employed whether or not protection switching is configured. When the network device is configured for protection switching, the network device may store the working connection coordinates. When protection switching is not configured, the network device may store the Time-Slot Interchange (TSI) connection coordinates. A single working map may apply to both the high-order and low-order cross-connection matrices.

High order protection maps and low order protection maps are available. High-order protection maps provide for protection switching of the high-order coordinates, while low-order protection maps are used to switch low-order coordinates. Protection maps provide coordinates for inputs containing protection traffic. The present system may derive the source coordinate for protection based on a combination of high order and low order protection maps. Combining the upper portion of the coordinate from one high-order protection map and the lower portion of the coordinate from one low-order protection map provides a final source coordinate. For any given destination coordinate, any of the high-order maps and any of the low-order maps can be used to derive final source coordinates for that destination. The micro engine 225 may determine the combination of maps used to determine the final source coordinate by selecting a coordinate within the working map or a coordinate derived from the high-order and low-order protection maps. In other words, the micro engine 225 may have protection maps and working maps at its disposal, and may use these maps to determine a way to reach a desired source coordinate or set of coordinates.

Micro engine 225 may select one of several protection connection maps to use for a given destination connection. This selection criteria may be dictated by incoming health codes. For a given configuration, the micro engine 225 may compare health codes associated with input connections destined for a given output connection. Of these inputs, the micro engine 225 may select the input connection having the best quality or lowest health code.

Before application of the protection switch, the input connection in the foregoing example may be qualified or verified using a variety of post processing filters. Post processing filters are specified in SONET/SDH standards.

The following post filters may be implemented using the micro engine 225 via the microcontroller interface (not shown):

1. 1+1 Revertive or Non-Revertive Modes.
2. A Hysteresis Switching Filter. Such a filter may be applied when the priority difference between the health codes of the protection and working traffic exceeds a predetermined amount.
3. Comparison of health codes from multiple protection traffic sources, including comparison of multiple protection switching layers.
4. Post-Hold Timers. Post-hold timers may reduce switching frequency, especially during transient conditions. Such timers can disable switching for a certain amount of time after the last protection switch.
5. Manual User Command via software.

The micro engine 225 may communicate the re-provisioning of the connection maps to the cross connect matrix 235 responsible for restoring the failed connection.

Although the channel health store 215, micro engine 225, and externally addressable program space 230 are shown as three separate elements, these components may be parts of the same application or piece of software, or may be embedded firmware or specialized hardware such as an application specific integrated circuit (ASIC).

Figure 3:
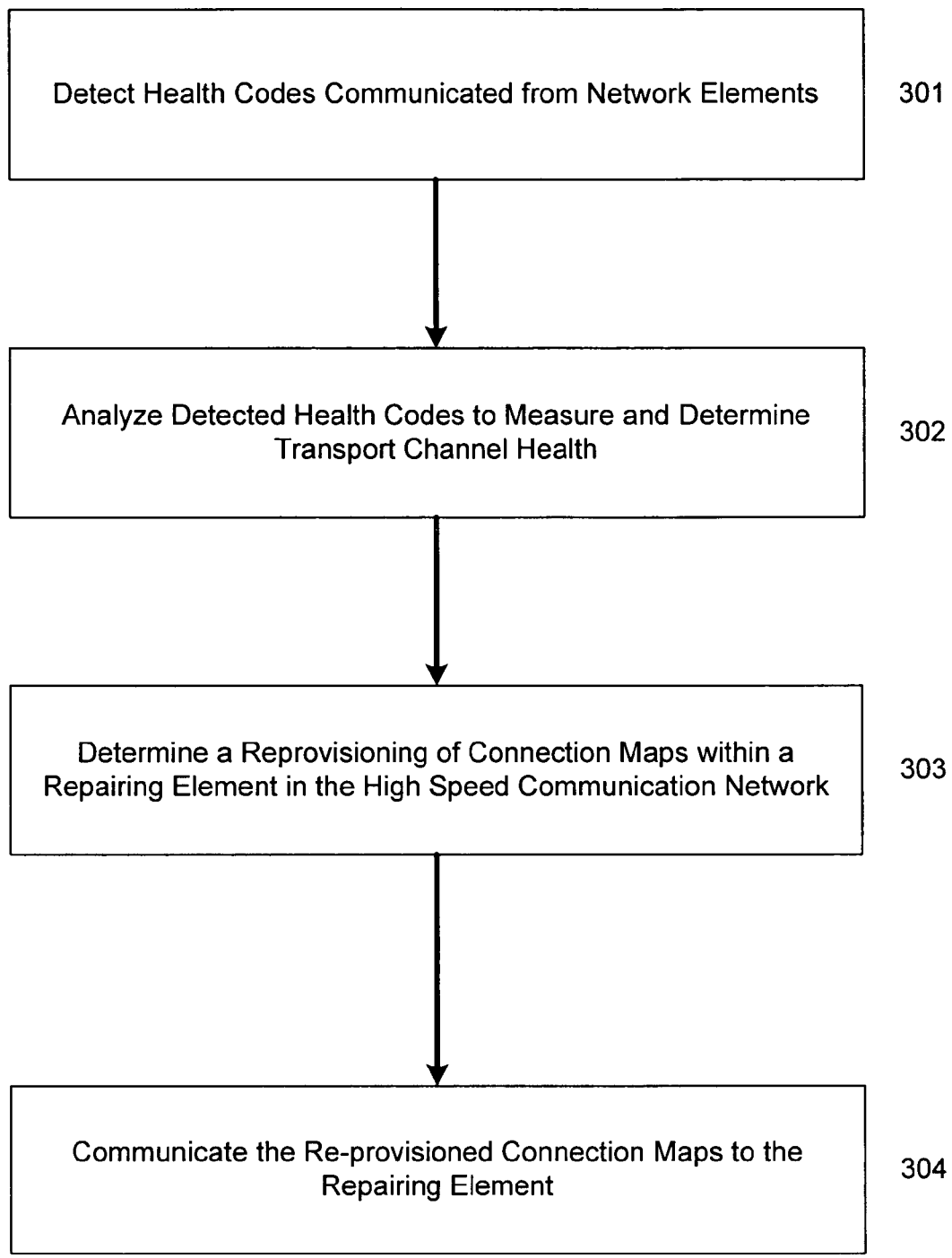
FIG. 3 illustrates a general flowchart representing an embodiment of the current design.

FIG. 3 illustrates a general flowchart of one embodiment of the present design. From FIG. 3, the design detects health codes communicated from network elements at point 301, analyzes detected health codes to measure and determine transport channel health at point 302, determines a reprovisioning of connection maps within a repairing element in the high speed communication network at point 303; and communicates re-provisioned connection maps to the repairing element at point 304.

The foregoing descriptions of specific embodiments of the present design have been presented for the purposes of illustration and description. They are not intended to be exhaustive or to limit the design to the precise forms disclosed, and should be understood that many modifications and variations are possible in light of the above teaching.

The embodiments were chosen and described in order to best explain the principle of the design and its practical application, to thereby enable others skilled in the art to best utilize the design and various embodiments with various modifications as are suited to the particular use contemplated. The present design has been described in a general SONET/SDH architecture. However, the present design has applications to other transmission architectures requiring a consolidated mix of health codes and communicate the health to the functional elements responsible for acting based on the communication. Therefore, it is intended that the scope of the design be defined by the claims appended hereto and their equivalents.

What is claimed is:

1. A method implemented by a networked device for restoring network connections subsequent to a transport channel failure in a high speed communication system using a plurality of connection maps establishing connections between elements in the high speed communication system, the method comprising:

detecting health codes communicated from network elements;

analyzing detected health codes to measure and determine transport channel health;

determining a reprovisioning of connection maps within a repairing element in the high speed communication network in response to the analyzing; and communicating re-provisioned connection maps to the repairing element.

2. The method of claim 1, wherein the determining the reprovisioning comprises employing decision-making processing to restore any failed connections.

3. The method of claim 2, wherein the decision making processing is user programmable.

4. The method of claim 1, further comprising evaluating protocols carried in transport overhead bytes to further determine transport channel health, wherein said evaluating is subsequent to said analyzing.

5. The method of claim 1, further comprising filtering detected health codes at the repairing network element.

6. The method of claim 5, wherein the filtering operates according to user-programmable configurations.

7. The method of claim 1, wherein said detected health codes are communicated by inserting these detected health codes into unused overhead bytes within a transport frame.

8. The method of claim 1, wherein said analyzing identifies a healthiest transport channel form a plurality of available transport channels.

9. An apparatus for restoring connections in a communication network upon a transport channel failure using re-provisioned connection maps, comprising:
- a preprocessing arrangement configured to receive and store health codes reported by detecting network elements; and
- a processor configured to analyze health codes of at least one transport channel, determine a correction procedure for any failed connection associated with at least one transport channel exhibiting at least one unsatisfactory health code, and create a reprovisioning scheme reprovisioning appropriate connection maps based on the correction procedure; and
- a transmitter configured to communicate the reprovisioning scheme to a repairing element.

10. The apparatus of claim 9, wherein the processor analyzes health using user programmable configurations.

11. The apparatus of claim 9, wherein the preprocessor is further configured to filter health codes.

12. The apparatus of claim 9, wherein said processor is further configured to compute implementation-dependent connection graphs using state information.

13. The apparatus of claim 12, wherein said processor is further configured to compute implementation-dependent connection graphs using history information.

14. The apparatus of claim 6, wherein said processor may be pre-provisioned with standard restoration schemes.

15. A method implemented by a networked device for restoring connections upon a transport channel failure in a communication network, the method comprising:
- comparing health codes received from a plurality of protection switching layers enabling restoration of communication using cascaded restoration schemes, said comparing resulting in at least one health code for at least one transport channel;
- determining a restoration scheme based on the at least one health code for at least one transport channel; and
- communicating the restoration scheme to a repairing element within the communication network, wherein the restoration scheme includes a re-provisioned connection map establishing at least one new connection between network elements.

16. The method of claim 15, wherein invoking the restoration scheme comprises employing decision-making processing to restore any failed connections.

17. The method of claim 16, wherein the decision making processing is user programmable.

18. The method of claim 15, further comprising evaluating protocols carried in transport overhead bytes to determine transport channel health, wherein said evaluating is prior to said comparing.

19. The method of claim 15, further comprising filtering health codes prior to said comparing.

20. The method of claim 19, wherein the filtering operates according to user-programmable configurations.

21. The method of claim 15, further comprising communicating health codes subsequent to said invoking by inserting health codes into unused overhead bytes within a transport frame.

22. A system comprising:
- at least one network element configured to generate heath codes;
- at least one line card comprising:
  - a framer, and
  - a controller comprising:
    - a preprocessing arrangement configured to receive and store health codes reported by detecting network elements;
    - a processor configured to analyze health codes of at least one transport channel, determine a correction procedure for any failed connection associated with at least one transport channel exhibiting at least one unsatisfactory health code, and create a reprovisioning scheme reprovisioning appropriate connection maps based on the correction procedure; and
    - a transmitter configured to communicate the re-provisioning scheme to a repairing element; and
- a fabric configured to provide intercommunication between the line card and at least one network element.

23. The system of claim 22, wherein the fabric is compatible with TFI-5.

24. The system of claim 22, wherein the fabric is compatible with CSIX.

25. The system of claim 22, wherein the line card is capable of providing an interface for a Fibre Channel compatible network.

26. The system of claim 22, wherein the line card is capable of providing an interface for an Ethernet compatible network.

27. The system of claim 22, wherein the line card is capable for performing add-drop multiplexing.

* * * * *